Patented Apr. 3, 1923.

1,450,483

UNITED STATES PATENT OFFICE.

DAVID CHIDLOW, OF RIDGEFIELD, CONNECTICUT, ASSIGNOR TO JAMES F. STRACHAN AND WILLIAM S. STRACHAN, BOTH OF MONTREAL, CANADA.

PROCESS OF MAKING BREAD.

No Drawing.     Application filed December 22, 1921. Serial No. 524,274.

*To all whom it may concern:*

Be it known that I, DAVID CHIDLOW, a subject of King George V of Great Britain, residing at Ridgefield, in the county of Fairfield and State of Connecticut, have invented an Improvement in Processes of Making Bread, of which the following description is a specification.

This invention relates to a new and improved process or method of making bread, whereby the animal life sustaining elements of grain are embodied in the baked bread without substantial change either of the gluten of the flour or the natural vitamines of the grain.

It is now a well recognized fact that the usual bread of commerce, such as white bread, for instance, fails to support animal life without the addition of vitamines through other foods. This results from the elimination of the germ and scutellum from the grain flour during the manufacture of the latter, so that bread and other food products made from such flour do not contain sufficient (1) fat soluble vitamine, (2) water soluble vitamine, and (3) anti-scorbutic vitamine, all of which form animal life sustaining essentials, and are found in the grain germ and scutellum (or tissue adjacent the germ).

Where, therefore, the principal source of food is the bread of commerce or as made in the household from wheat or other grain flour from which the germ and scutellum have been removed, it is now necessary to supply the requisite vitamines for animal life preservation through other foods. Attempts have been made heretofore to overcome this lack of food value in ordinary bread by the addition of roasted or parched germ to the flour. The roasting or parching heat, however, destroys the vitamines, so that the addition of such roasted germ and scutellum to the flour or bread compound does not add to the food value of the product.

The object of the present invention is to provide a new and improved method of making bread of high food value by adding to the bread compound between the commencement and completion of the fermentation period an appropriate quantity of grain germ and scutellum in the natural state sufficiently proximate to the baking period that the gluten in the partly fermented compound may not be substantially injured or destroyed by the enzymes (or digesting bodies) of the germ and scutellum.

There are two well known ways now in general practice for making bread, one is known as the sponge process and the other as the straight dough process. In the sponge process, it is customary to make a preliminary mixture consisting of about one-half of the flour, somewhat more than one-half of the liquid, and usually all of the yeast. These ingredients are thoroughly mixed and are then allowed to ferment for a suitable period of time. Toward the end of the sponge fermentation, it " falls," and is then permitted to rise again, after which the remainder of the flour and the other ingredients which are to enter into the composition of the final dough are added. These ingredients are then thoroughly incorporated with the preliminary sponge under suitable conditions of temperature. The resulting dough is thereafter allowed to ferment further, and is, in the usual practice divided into loaves, permitted to rise, and finally baked.

In the straight dough process, all of the ingredients are usually incorporated at the beginning of the operation, and with certain well known differences in the manipulation of the dough during the fermenting period, the straight dough process proceeds along the same general lines as the sponge process after the preliminary dough and ingredients that are added have been mixed.

If the germ and scutellum in the natural state are added to the flour and made into bread, it is found that the enzymes present in the germ and scutellum attack or digest the gluten of the flour. This digesting effect is related to time, and the longer the germ and scutellum are in contact with the gluten of the flour in the sponge or dough, the less capacity the gluten has to retain the gases produced by fermentation.

Therefore, in accordance with the present invention the wheat or other flour, in the form of sponge or dough, is fermented for a part of the usual period of fermentation employed for such flour, usually about 70% thereof. The grain germ and scutellum, in the natural, raw, or prepared condition is then added in the desired proportion and is mixed in the sponge or dough, and the mixture is further fermented, say for about 30 to 60 minutes, divided into loaves, and baked before the enzymes of the germ and scutellum can digest or materially destroy the gluten.

The amount of germ and scutellum added to the sponge or dough may be in excess of the proportion of the natural grain contents, or it may be added in any desired proportion, and the enzymes of the germ and scutellum will seek to attack and destroy the gluten existing in the bread compound, but they will be arrested in this by baking, sufficiently early to prevent any material destructive condition in the gluten.

Since, in accordance with the present invention, the germ and scutellum of the grain are not heated until they are incorporated in the loaf being baked, the oils and other substances of high food value that may be freed from the germ and scutellum during the baking, will be retained in the bread.

Claims.

1. The process of making bread, which consists in mixing flour and other ingredients to form the bread compound, fermenting the bread compound for a part of the usual period of fermentation for such compound, then adding grain germ to the bread compound between the commencement and completion of the fermentation period, and then baking the bread compound at a period sufficiently proximate to the addition of the germ to prevent substantial destruction of the gluten by the germ.

2. The process of making bread, which consists in mixing flour and other ingredients to form a dough or sponge compound, fermenting the dough or sponge compound and before the fermentation of the compound is completed adding grain germ to the compound, then baking the compound at a period sufficiently proximate to the addition of the germ to prevent any substantial destruction of the gluten of the compound by the added germ.

3. The process of making bread, which consists in mixing flour and other ingredients to form a bread compound, fermenting the bread compound, and before the fermentation is entirely completed adding a quantity of grain germ and scutellum, then further fermenting the compound, and baking the bread compound before substantial destruction of the gluten in the compound by the germ.

In testimony whereof, I have signed my name to this specification.

DAVID CHIDLOW.